US005655127A

United States Patent [19]
Rabe et al.

[11] Patent Number: 5,655,127
[45] Date of Patent: Aug. 5, 1997

[54] METHOD AND APPARATUS FOR CONTROL OF POWER CONSUMPTION IN A COMPUTER SYSTEM

[75] Inventors: Jeffrey L. Rabe, Rancho Cordova; Zohar Bogin, Folsom; Ajay V. Bhatt, El Dorado Hills; James P. Kardach, San Jose; Nilesh V. Shah, Folsom, all of Calif.

[73] Assignee: Intel Corporation, Santa Clara, Calif.

[21] Appl. No.: 612,673

[22] Filed: Mar. 8, 1996

Related U.S. Application Data

[63] Continuation of Ser. No. 191,651, Feb. 4, 1994, abandoned.

[51] Int. Cl.$^6$ ..................................................... G06F 1/26
[52] U.S. Cl. .................. 395/750.04; 345/838; 345/868; 345/734
[58] Field of Search .................. 395/750, 838, 395/868, 734

[56] References Cited

U.S. PATENT DOCUMENTS

| | | |
|---|---|---|
| 3,623,017 | 11/1971 | Lowell et al. . |
| 3,715,729 | 2/1973 | Mercy . |
| 3,736,569 | 5/1973 | Bouricius et al. ............. 395/750 |
| 3,737,637 | 6/1973 | Frankeny et al. ............. 371/28 |
| 3,895,311 | 7/1975 | Basse et al. . |
| 3,919,695 | 11/1975 | Gooding . |
| 3,931,585 | 1/1976 | Barker et al. . |
| 3,936,762 | 2/1976 | Cox, Jr. et al. . |
| 4,077,016 | 2/1978 | Sanders et al. . |
| 4,095,267 | 6/1978 | Morimoto . |

(List continued on next page.)

FOREIGN PATENT DOCUMENTS

| | | |
|---|---|---|
| 0103755 | 8/1983 | European Pat. Off. . |
| 0140814 | 5/1984 | European Pat. Off. . |
| 0242010 | 12/1987 | European Pat. Off. . |
| 0368144 | 2/1989 | European Pat. Off. . |
| 0366250 | 9/1989 | European Pat. Off. . |
| 0419908 | 6/1990 | European Pat. Off. . |
| 0451661 | 3/1991 | European Pat. Off. . |

(List continued on next page.)

OTHER PUBLICATIONS

Slater, Michael, "*MIPS Previews 64–bit R4000 Architecture*", Microprocessor Report, vol. 5, Issue: n2, p1(6), Feb. 6, 1991.

Case, Brian, "*R4000 Extends R3000 Architecture With 64–bit Capabilities*", Microprocessor Report, vol.: v5, Issue: n19, p10(4), Oct. 16, 1991.

Wilson, Ron, "*MIPS Rethinks RISC With Superpipelining*", Computer Design, vol.: v30, Issue: n3, p28(3), Feb. 1, 1991.

Intel Automotive Components Handbook, "*Power–On Reset*", 1988, pp. 10–24 & 10–25.

Motorola MC6802032—Bit Microprocessor User's Manual, 3rd Edition, 1990, pp. 1–3.

*Primary Examiner*—Glenn A. Auve
*Assistant Examiner*—Jeffrey K. Seto
*Attorney, Agent, or Firm*—Blakely, Sokoloff, Taylor & Zafman

[57] ABSTRACT

A computer system having a responsive low-power mode and a full-power mode of operation. The computer system includes a power consumption controller, a processor and a communication device. The power consumption controller generates an interrupt signal in response to a low power event or a fully operational event. The power consumption controller also generates a clock control signal. The clock control signal is deasserted during the full-power mode of operation and alternatively asserted for a first duration and deasserted for a second duration during the low-power mode of operation. In response to an asserted clock control signal, the processor suppresses the internal clock signal to at least one functional block within the processor and in response to a deasserted clock control signal, the processor transmits the internal clock signal to at least one functional block within the processor. By transmitting the internal clock signal to at least one functional block within the processor during the low-power mode of operation, the processor may respond to communication signals from a communication device during the low-power mode of operation.

18 Claims, 9 Drawing Sheets

U.S. PATENT DOCUMENTS

| | | |
|---|---|---|
| 4,203,153 | 5/1980 | Boyd . |
| 4,264,863 | 4/1981 | Kojima . |
| 4,293,927 | 10/1981 | Hoshii . |
| 4,300,019 | 11/1981 | Toyomaki . |
| 4,365,290 | 12/1982 | Nelms et al. . |
| 4,405,898 | 9/1983 | Flemming . |
| 4,479,191 | 10/1984 | Nojima et al. . |
| 4,545,030 | 10/1985 | Kitchin . |
| 4,615,005 | 9/1986 | Maejima et al. . |
| 4,638,452 | 1/1987 | Schultz et al. . |
| 4,639,864 | 1/1987 | Katzman et al. . |
| 4,667,289 | 5/1987 | Yoshida et al. . |
| 4,669,099 | 5/1987 | Zinn . |
| 4,698,748 | 10/1987 | Juzswik et al. . |
| 4,758,945 | 7/1988 | Remedi . |
| 4,763,294 | 8/1988 | Fong . |
| 4,766,597 | 8/1988 | Kato . |
| 4,780,843 | 10/1988 | Tietjen . |
| 4,814,591 | 3/1989 | Nara et al. . |
| 4,823,292 | 4/1989 | Hillion . |
| 4,841,440 | 6/1989 | Yonezu et al. . |
| 4,881,205 | 11/1989 | Aihara . |
| 4,896,260 | 1/1990 | Hyatt . |
| 4,907,183 | 3/1990 | Tanaka . |
| 4,922,450 | 5/1990 | Rose et al. . |
| 4,935,863 | 6/1990 | Calvas et al. . |
| 4,979,097 | 12/1990 | Triolo et al. . |
| 4,980,836 | 12/1990 | Carter et al. ............. 364/483 |
| 4,983,966 | 1/1991 | Grone et al. . |
| 4,991,129 | 2/1991 | Swartz . |
| 5,021,679 | 6/1991 | Fairbanks et al. . |
| 5,059,924 | 10/1991 | Check . |
| 5,077,686 | 12/1991 | Rubinstein . |
| 5,083,266 | 1/1992 | Watanabe ............. 395/275 |
| 5,103,114 | 4/1992 | Fitch . |
| 5,123,107 | 6/1992 | Mensch, Jr. . |
| 5,129,091 | 7/1992 | Yorimoto et al. . |
| 5,133,064 | 7/1992 | Hotta et al. . |
| 5,151,992 | 9/1992 | Nagae . |
| 5,167,024 | 11/1992 | Smith et al. ............. 395/375 |
| 5,175,845 | 12/1992 | Little . |
| 5,189,647 | 2/1993 | Suzuki et al. . |
| 5,220,672 | 6/1993 | Nakao et al. . |
| 5,239,652 | 8/1993 | Seibert et al. . |
| 5,249,298 | 9/1993 | Bolan et al. . |
| 5,251,320 | 10/1993 | Kuzawinski et al. . |
| 5,263,028 | 11/1993 | Borgnis et al. . |
| 5,319,771 | 6/1994 | Takeda . |
| 5,329,621 | 7/1994 | Burgess et al. . |
| 5,335,168 | 8/1994 | Walker ............. 364/707 |
| 5,336,939 | 8/1994 | Eitrheim et al. . |
| 5,355,501 | 10/1994 | Gross et al. . |
| 5,359,232 | 10/1994 | Eitrheim et al. . |
| 5,369,771 | 11/1994 | Gettel ............. 395/750 |
| 5,396,635 | 3/1995 | Fung ............. 395/800 |
| 5,404,546 | 4/1995 | Stewart . |
| 5,428,754 | 6/1995 | Baldwin . |
| 5,461,652 | 10/1995 | Hongo . |

FOREIGN PATENT DOCUMENTS

| | | |
|---|---|---|
| 0478132 | 12/1991 | European Pat. Off. . |
| 0654726 | 10/1994 | European Pat. Off. . |
| 9302408 | 2/1993 | Germany . |
| 2010551 | 11/1978 | United Kingdom . |
| 2130765 | 10/1983 | United Kingdom . |

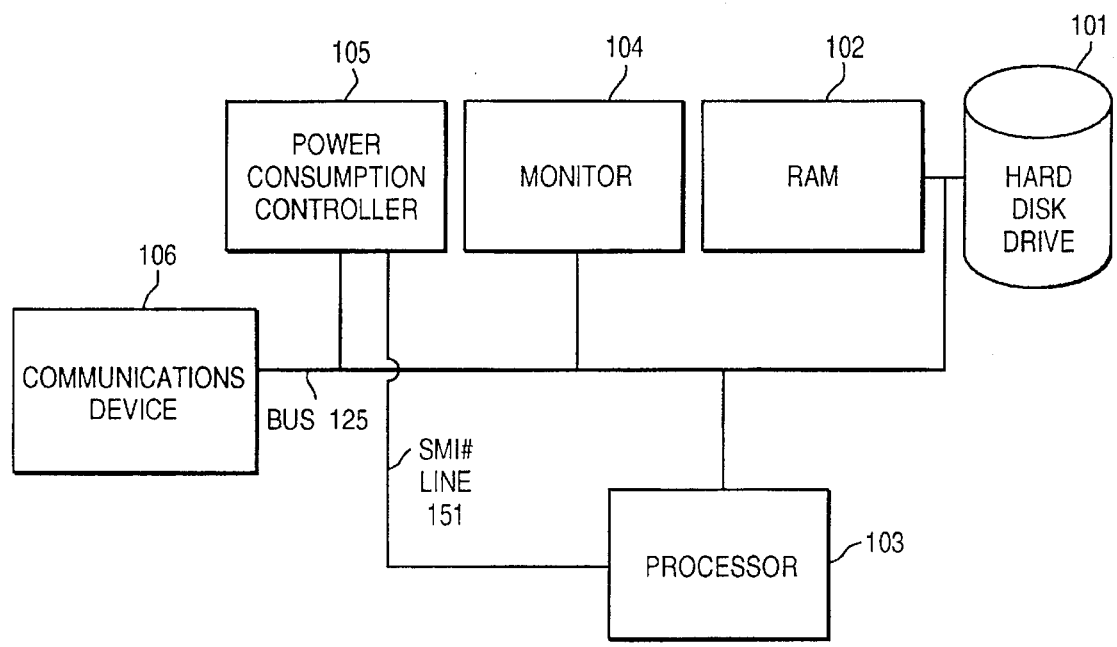
FIG_1
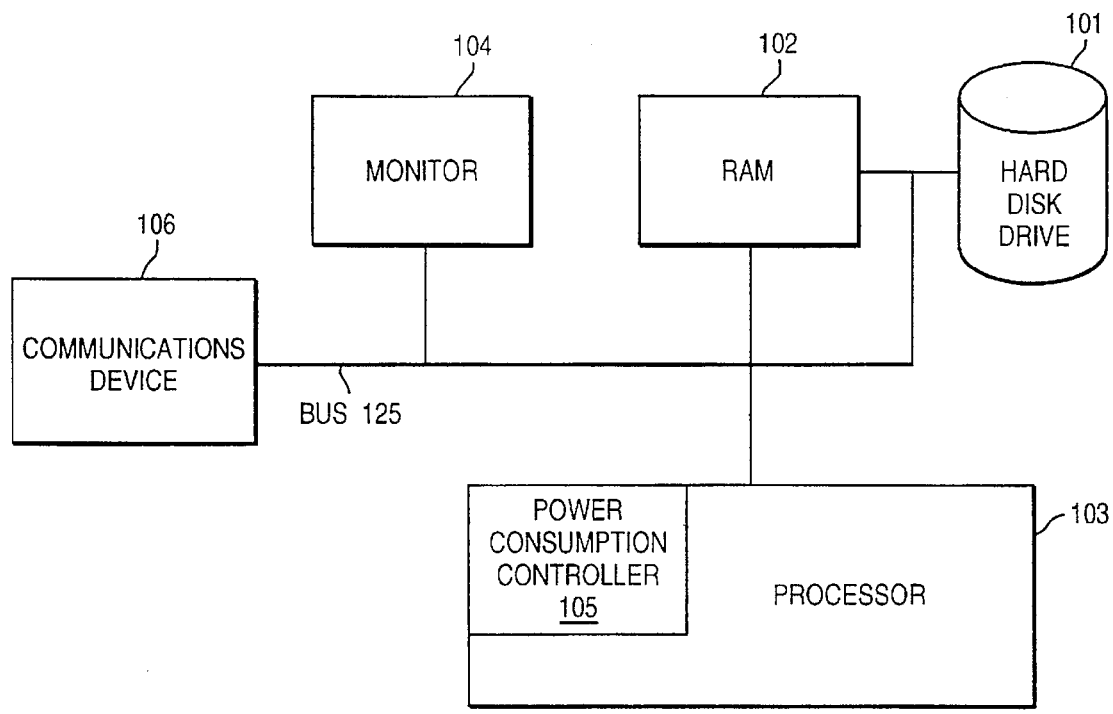
FIG_2

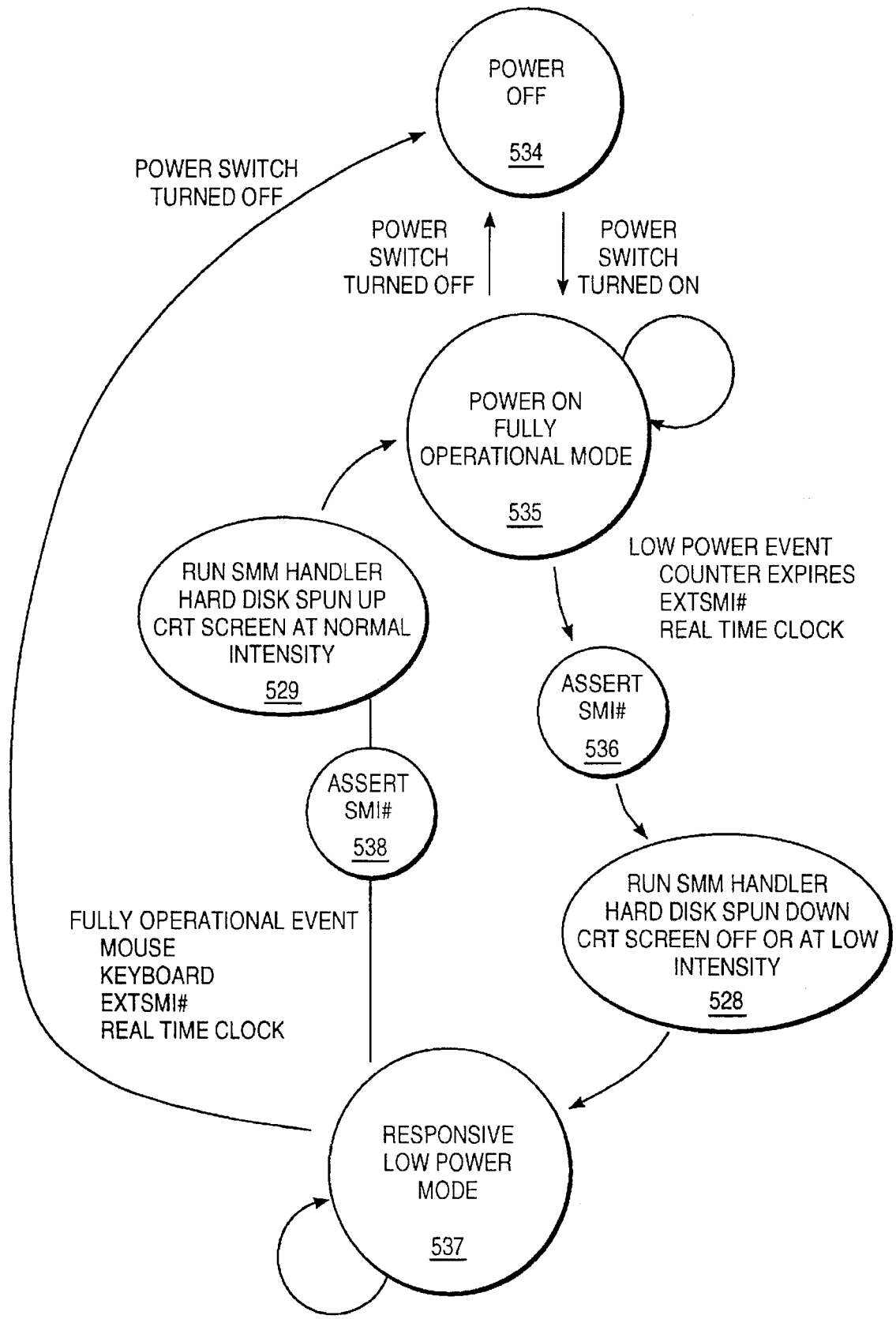
FIG_3

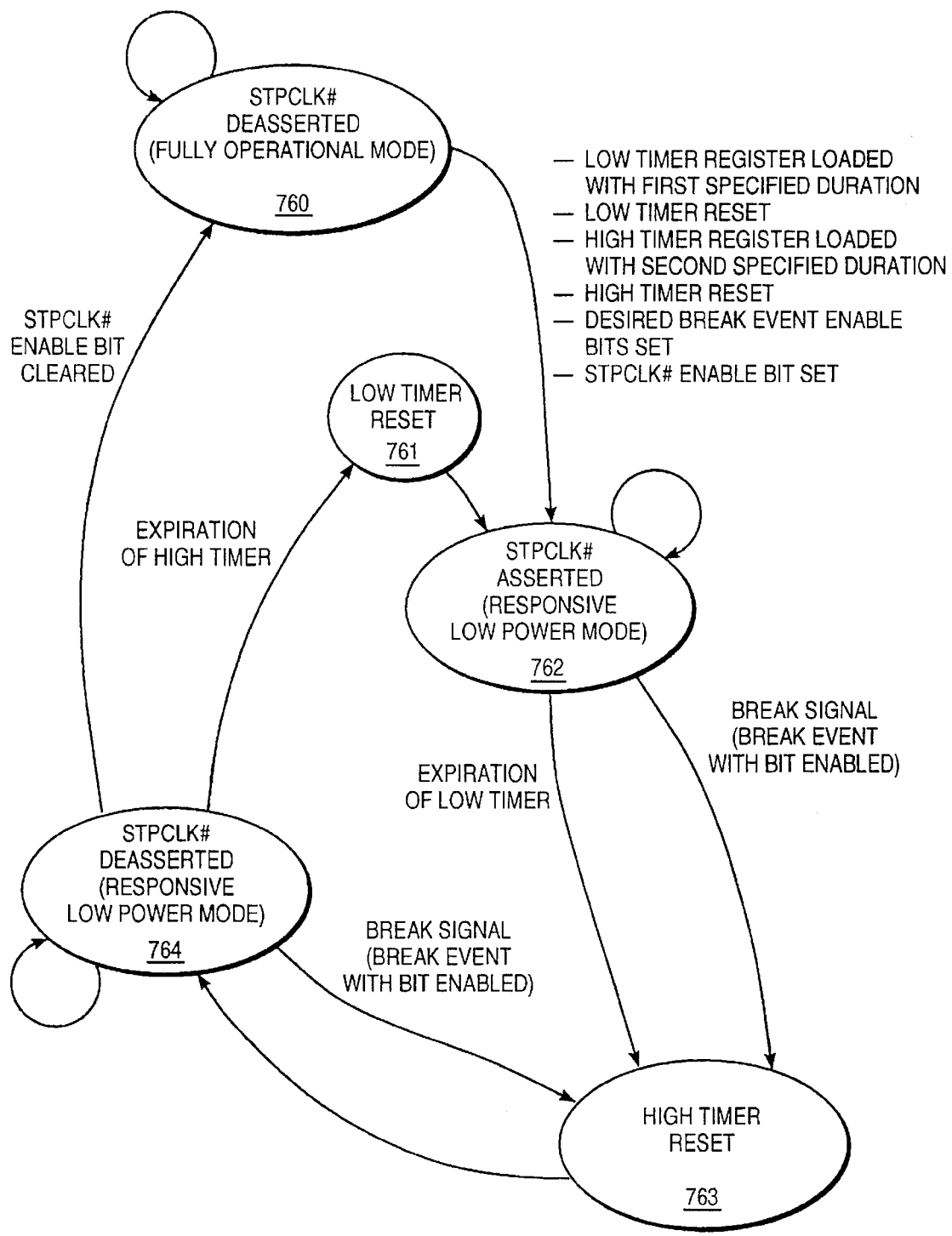
FIG_6

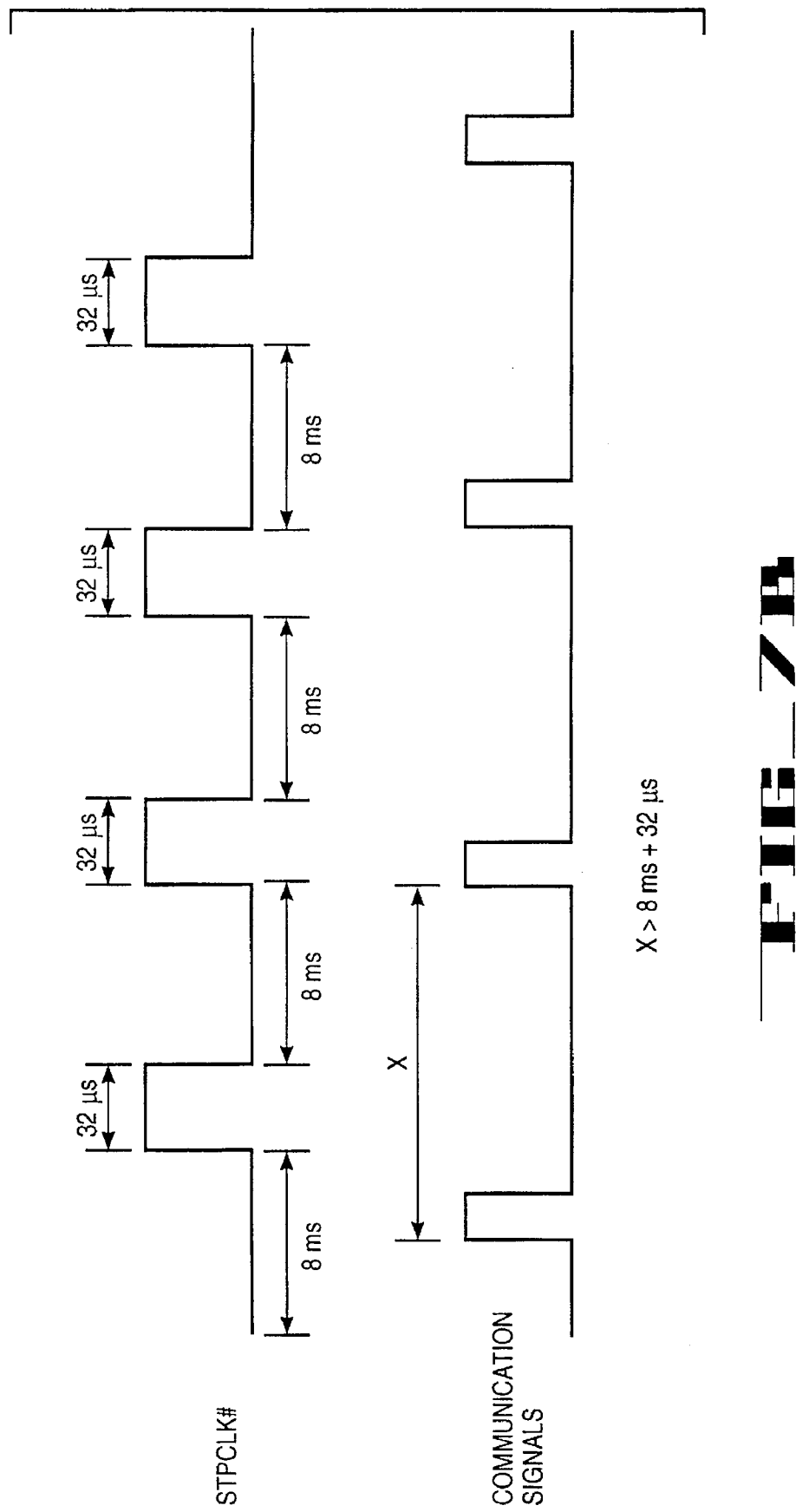
FIG_7B

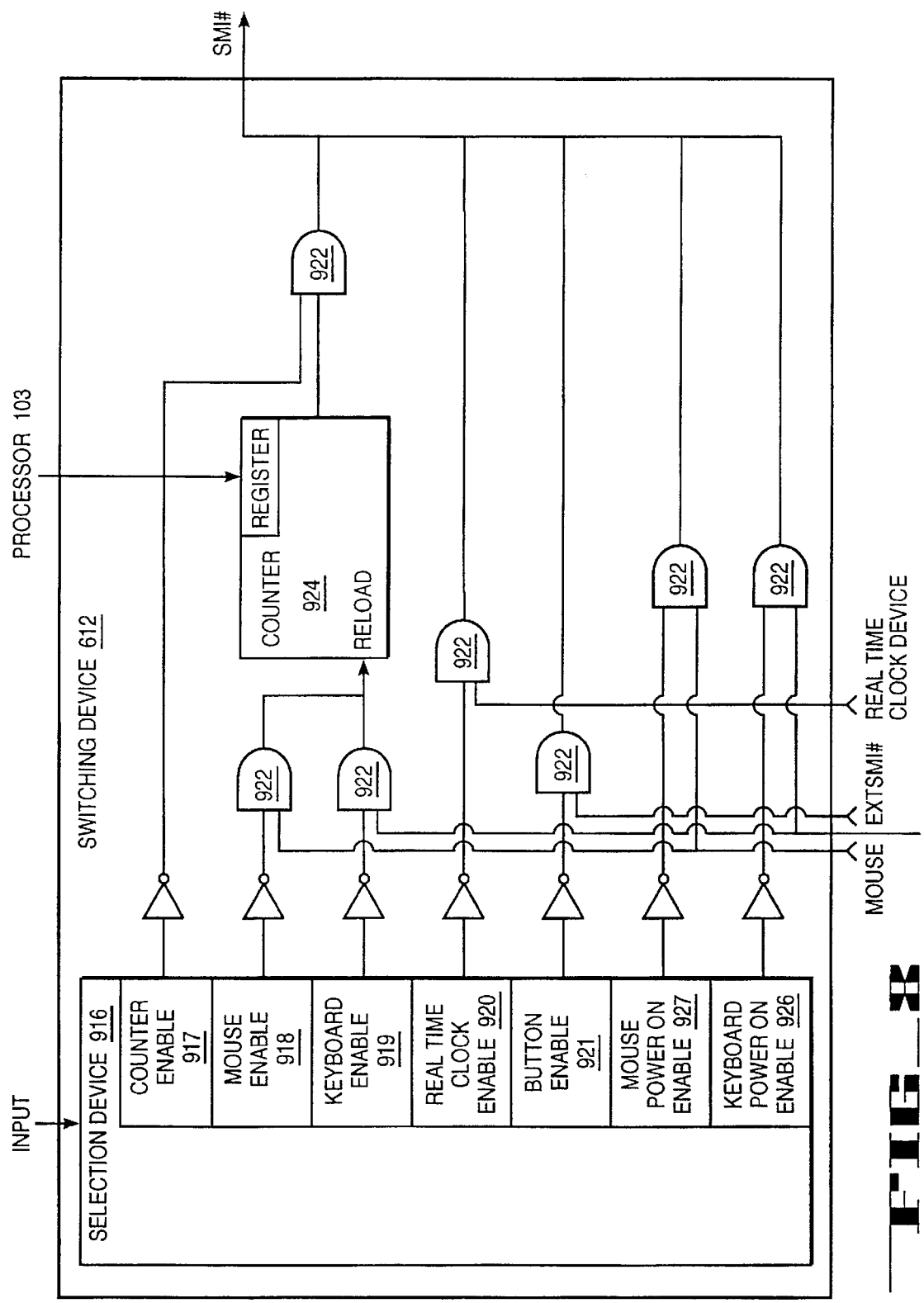
FIG. X

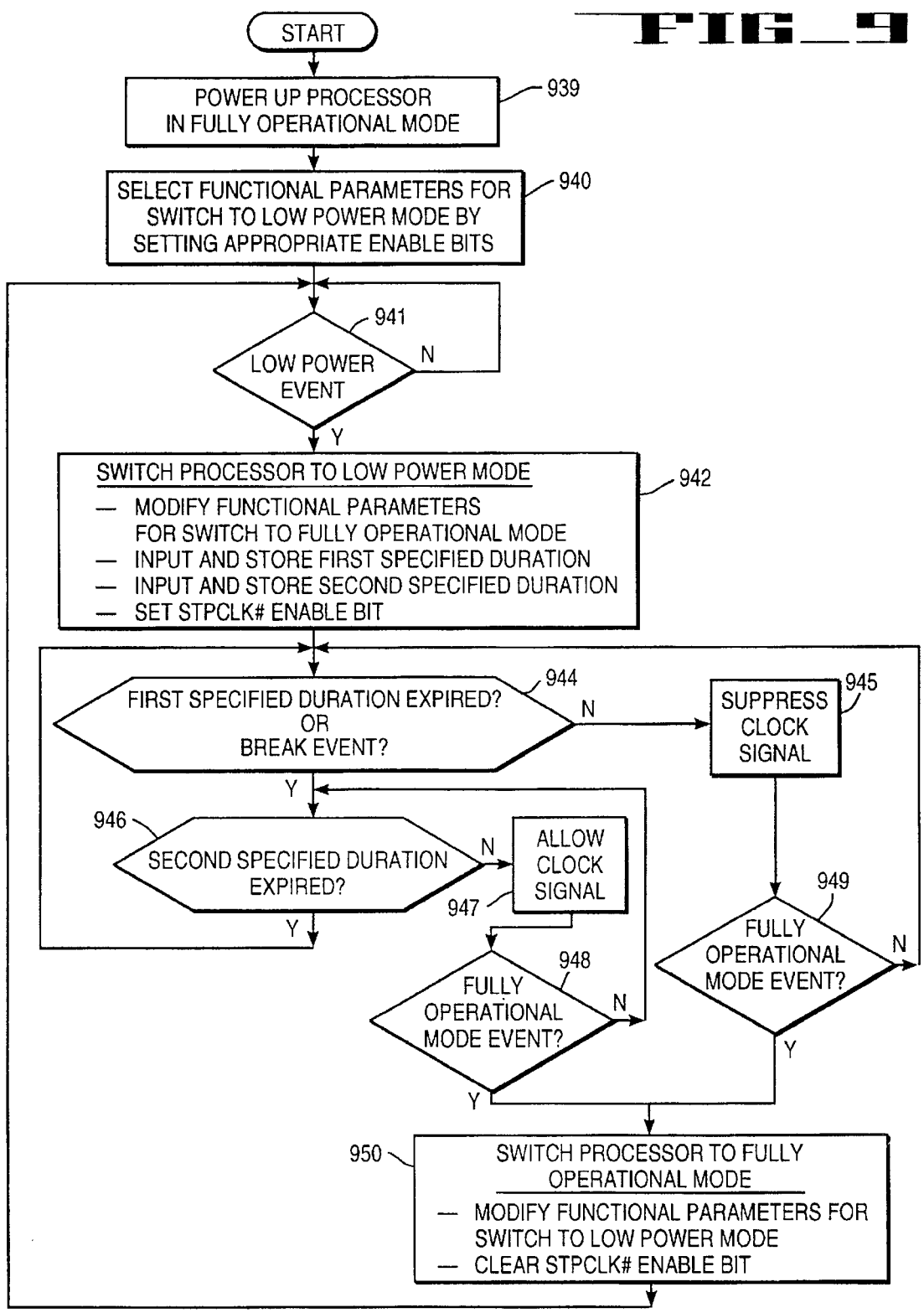

METHOD AND APPARATUS FOR CONTROL OF POWER CONSUMPTION IN A COMPUTER SYSTEM

This is a continuation of application Ser. No. 08/191,651, filed Feb. 4, 1994, now abandoned.

FIELD OF THE INVENTION

The present invention relates to the field of computer systems. More particularly, the present invention relates to the control of power consumption in computer systems.

BACKGROUND OF THE INVENTION

Existing computer systems consume large amounts of electrical power when operating in the fully operational mode. These systems typically lack power consumption controllers and thus when left idle, the systems continue to remain in the fully operational mode. The United States Environmental Protection Agency (EPA) has established guidelines encouraging the manufacture of computer systems which when left idle for an extended period only consume a specified amount of electrical power or less.

One prior power consumption controller was used in portable computer systems. The prior controller would turn off the monitor, spin down the hard disk and shut down the central processing unit (CPU). Because the prior controller shut down the CPU, the portable system could not be responsive to signals coming from a communications device, for instance, a network, fax machine or modem. However, most portable systems were not connected to a communications device anyway and thus did not need to be responsive to signals from the communications device. Desktop computer systems on the other hand, usually are connected to a communications device and need to be responsive to signals from the communications device. Use of the prior controller in a desktop system connected to a communications device causes the desktop system to fail to respond to signals from the communications device after a specified idle period when the CPU is shut down. With the network as a communications device, the network deactivates the system address, in effect, removing the system from the network after the failure to respond. Other systems in the network becomes unable to communicate with the desktop system and the desktop system becomes unable to receive any information from the network.

Similarly, with a fax machine or modem as the communications device connected to the desktop system, the prior controller in the desktop system causes the desktop system to fail to respond to communications signals. In this case, the fax machine or modem ceases transmission of data and the desktop system fails to receive the data.

It would be highly beneficial to have a desktop computer system with a power consumption controller that switches the system between a fully operational mode and a responsive low power mode, where the responsive low power mode still allows the system to be responsive to communications device signals. The system could then satisfy EPA guidelines by switching to the responsive low power mode after a specified idle period, and respond to communications signals or process information from the communications device.

Thus, what is needed is a power consumption controller that switches a computer system between a fully operational mode and a responsive low power mode.

SUMMARY OF THE INVENTION

A novel power consumption controller is described. The power consumption controller comprises a switching device for switching the computer system between a fully operational mode and a responsive low power mode. In addition, in one embodiment the power consumption controller can include a clock controller for cyclically suppressing a clock signal to a portion of a processor for a first specified duration when the computer system is in the responsive low power mode. Under this embodiment, the clock controller also cyclically allows the clock signal to be transmitted to the portion of the processor for a second specified duration when the computer system is in the responsive low power mode. Moreover, the power consumption controller can include a break event device for signaling the clock controller to allow the clock signal to be transmitted to the portion of the processor for a second specified duration. Finally, the power consumption controller can include a selection device for selecting functional parameters of the power consumption controller, which defines events causing switching between the modes.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram illustrating a computer system of one embodiment of the present invention.

FIG. 2 is a block diagram illustrating a computer system with a processor incorporating the power consumption controller.

FIG. 3 is a state diagram illustrating the operation of a power consumption controller of FIG. 1.

FIG. 6 is a state diagram illustrating the operation of STPCLK# signal state machine of FIG. 5.

FIG. 7b is a timing diagram illustrating communication signals being transmitted from a communication device.

FIG. 8 is a block diagram illustrating a switching device of a seventh embodiment of the present invention.

FIG. 9 is a flow chart illustrating the steps for controlling the power consumption of a processor.

DETAILED DESCRIPTION

Figure 4:
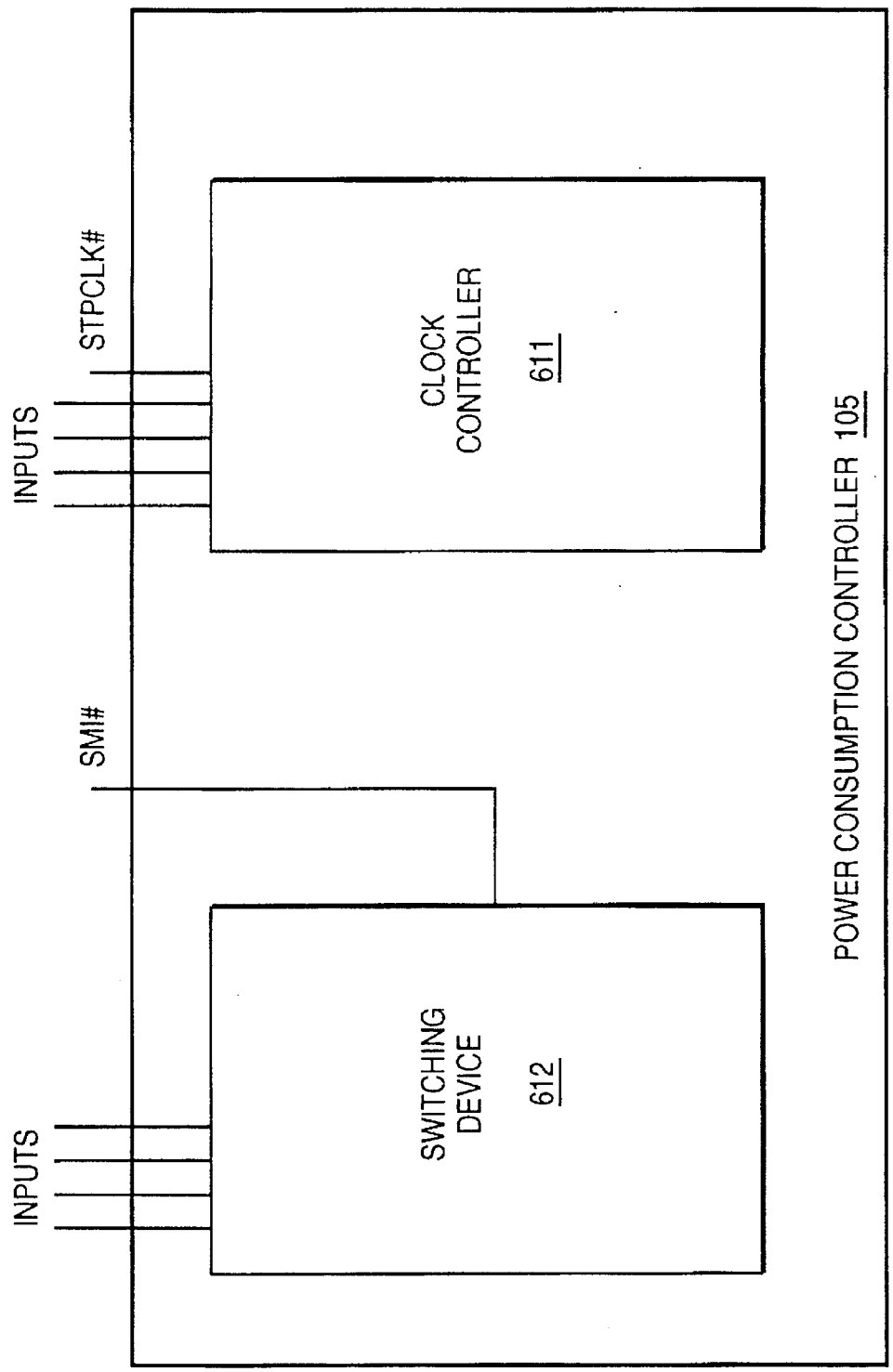
FIG. 4 is a block diagram illustrating the power consumption controller of FIG. 1.

A power consumption controller and a method for controlling power consumption is described. In the following description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

FIG. 1 is a block diagram illustrating a computer system of one embodiment of the present invention. The computer system includes hard disk drive 101, random access memory (RAM) 102, processor 103, monitor 104, power consumption controller 105 and communications device 106. Hard disk drive 101 and monitor 104 are coupled to processor 103 by bus 125. Processor 103 in turn is coupled to power consumption controller 105 by line 151. It will be appreciated that power consumption controller 105 can be incorporated into other devices.

FIG. 2 is a block diagram illustrating a computer system with a processor incorporating the power consumption controller. In the system, power consumption controller 105 is built into processor 103. Processor 103 has the necessary circuitry and logic to carry out the functions of power consumption controller 105. In addition, signals from power consumption controller 105 that would normally transmitted across line 151 to processor 103 now proceed directly to processor 103.

FIG. 3 is a state diagram illustrating the operation of a power consumption controller of FIG. 1. When the system is first turned on, the system transitions from the power off state 534 to the power on state 535 where the system is in the fully operational mode. Power consumption controller 105 remains in the fully operational mode until the power switch is turned off or a low power event occurs. When power switch is turned off, controller 105 transitions to the power off state where controller 105 along with the rest of the system is turned off. On the other hand, when the power switch is not turned off, power consumption controller 105 waits for a low power event. Low power events are events which cause the switch to the responsive low power mode and are selectable at boot up of the system or by processor 103. Low power events can include the expiration of elapsed time as indicated by a counter, the receipt of an external signal from a push button (EXTSMI#), and a signal from a real time clock device indicating current time is the preset time for switching to responsive low power mode. It will be appreciated that other events can also be selected as low power events.

Power consumption controller 105 responds to a low power event by asserting a SMI# signal to processor 103, state 536. Processor 103 responds by running software called SMM Handler as shown in state 528. SMM Handler includes code that processor 103 executes to instruct the hard disk to spin down and the monitor to turn off or reduce intensity. Processor 103 then executes the SMM Handler code to switch to the responsive low power mode, state 537. In the responsive low power mode, controller 105 asserts an active low STPCLK# signal to processor 103 for a first specified duration and deasserts STPCLK# signal to processor 103 for a second specified duration. While controller 105 remains in the responsive low power mode, it repeats the assertion and deassertion of STPCLK# signal in the manner described above. Processor 103 responds to the assertion of STPCLK# signal by suppressing the clock signal to a portion or all of processor 103. Processor 103 responds to the deassertion of STPCLK# signal by recoupling the clock signal to the previously suppressed portion of processor 103. It will be appreciated that processor 103 is at least partially off for the first specified duration while STPCLK# signal is asserted and operating at full capacity for the second specified duration while STPCLK# signal is deasserted. Because processor 103 is at least partially off for the first specified duration in each cycle, power consumption is reduced. In addition, because processor 103 is operating at full capacity for the second specified duration in each cycle, processor 103 is responsive to signals from communications device 106 during the second specified duration. Thus, it will be appreciated that processor 103 will be sufficiently responsive to remain on a network where the time between each network poll is greater than the first specified duration plus the second specified duration. It will also be appreciated that processor 103 will be sufficiently responsive to remain on a network where the first specified duration and second specified duration are set such that processor 103 can acknowledge within the latency period.

Power consumption controller 105 remains in the responsive low power mode until the power switch is turned off or a fully operational event occurs. When power switch is turned off, controller 105 transitions to the power off state where controller 105 along with the rest of the system is turned off, state 534. On the other hand, when a fully operational event occurs, controller 105 asserts a second SMI# signal, state 538. Fully operational events are events which cause the switch to the fully operational mode and like low power events are selectable by processor 103. Fully operational events can include movement of a mouse device, input to a keyboard, the receipt of an external signal from a push button (EXTSMI#), and a signal from a real time clock device indicating current time is the preset time for switching to fully operational mode. It will be appreciated that other events can also be selected as fully operational events.

As described above, controller 105 responds to a fully operational event by asserting a second SMI# signal to processor 103, state 538. Processor 103 responds by running the SMM Handler software, state 529. SMM Handler includes code that processor 103 executes to instruct the hard disk to spin up and the monitor to turn on to normal intensity. Processor 103 then executes SMM Handler code to switch to the fully operational mode, state 535. In the fully operational mode, controller 105 no longer asserts the STPCLK# signal and processor 103 remains fully operational. Controller 105 operates in the fully operational mode as described above.

FIG. 4 is a block diagram illustrating the power consumption controller of FIG. 1. Power consumption controller 105 includes switching device 612 and clock controller 611. Switching device 612 is coupled to inputs from processor 103 and other devices in the computer system. The other devices can include a mouse device, keyboard, low power mode button, real time clock or other similar devices. In addition, processor 103 also has inputs to clock controller 611. Switching device 612 switches the computer system between a fully operational mode and a responsive low power mode by asserting a SMI# signal. As described above, when the computer system is in the fully operational mode, an assertion of a SMI# signal switches the computer system to a responsive low power mode. On the other hand, when the computer system is in the responsive low power mode, an assertion of a SMI# signal switches the computer system to a fully operational mode.

In this embodiment, switching device 612 asserts the SMI# signal to processor 103 using line 151. However, under an alternative embodiment, switching device 612 can also assert the SMI# signal to processor 103, clock controller 611 or to other devices in the computer system such as monitor 104 or hard disk drive 101. In addition, switching device 612 can assert the SMI# signal on bus 125 to a separate device which asserts another SMI# signal directly to processor 103 on a dedicated line. When processor 103 receives the SMI# signal, it signals clock controller 611 to switch it to a responsive low power mode if it was previously in a fully operational mode; it signals clock controller 611 to switch it to a fully operational mode if it was previously in a responsive low power mode. As described above, in the responsive low power mode, clock controller 611 asserts STPCLK# signal to processor 103 for a first specified duration and deasserts STPCLK# signal to processor 103 for a second specified duration. In the fully operational mode, clock controller 611 no longer asserts STPCLK# signal and processor 103 remains fully operational.

Figure 5:
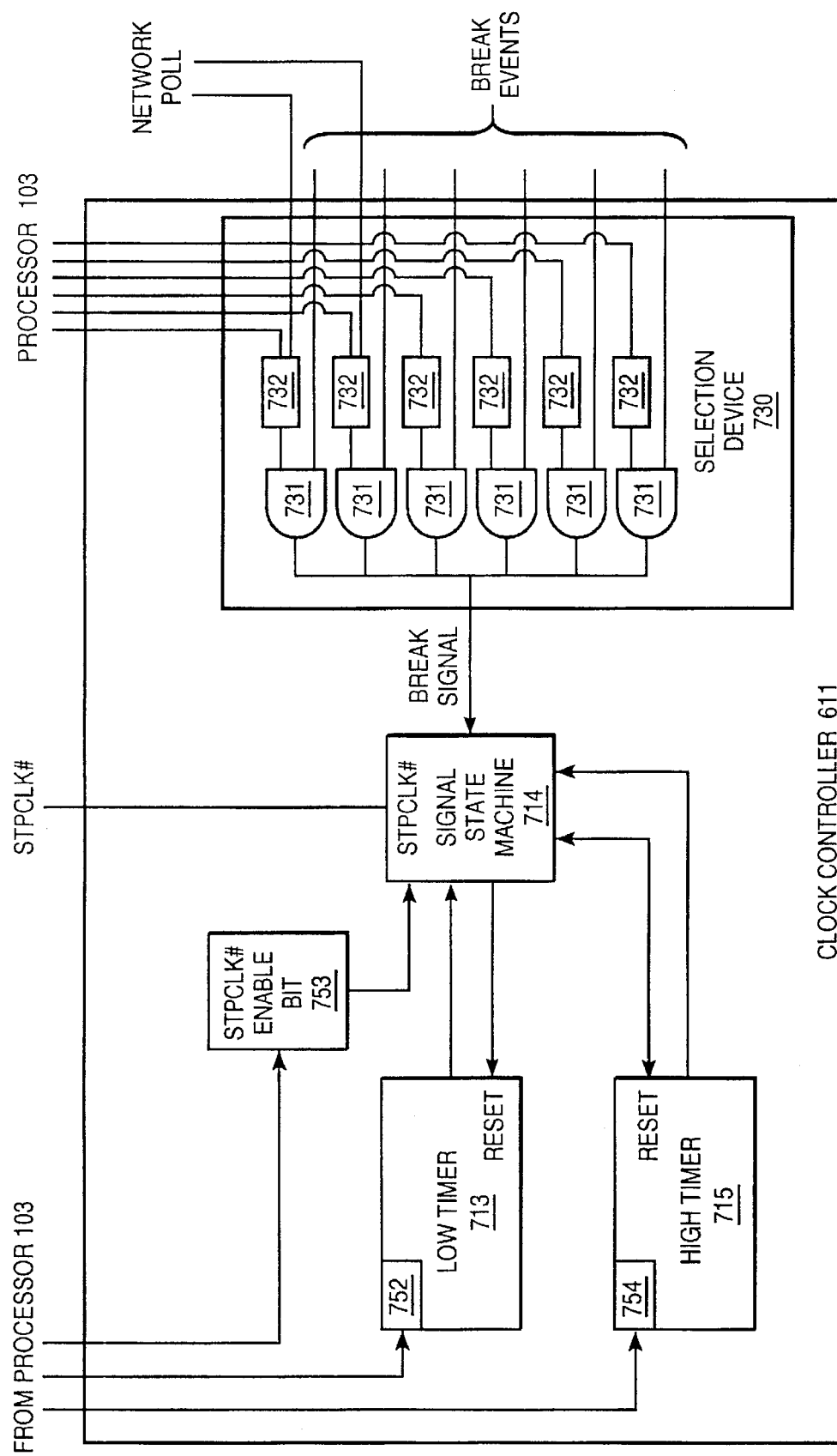
FIG. 5 is a block diagram illustrating a clock controller of FIG. 4.

FIG. 5 is a block diagram illustrating a clock controller of FIG. 4. Clock controller 611 comprises of STPCLK# enable bit 753, low timer register 752 and high timer register 754 which are all coupled to processor 103. Clock controller 611 also comprises of low timer 713, high timer 715 and STPCLK# signal state machine 714. When the computer system is in the fully operational mode, a SMI# signal asserted by switching device 612 to processor 103 causes processor 103 to run the SMM Handler code. In executing the instructions, processor 103 loads the first specified duration into low timer register 752 and the second specified duration into high timer register 754. Processor 103 then sets STPCLK# enable bit. In this embodiment, the first specified duration and the second specified duration range from 32 microseconds to eight milliseconds in 32 microsecond increments. It is to be appreciated that clock controller 611 can utilize other ranges by utilizing other high timers and low timers with different clock pulses.

When processor 103 loads low timer register 752 and high timer register 754, it resets both low timer 713 and high timer 715. When processor 103 sets STPCLK# enable bit 753, STPCLK# signal state machine 714 asserts STPCLK# signal. The setting of STPCLK# enable bit 753 marks the beginning of the responsive low power mode. STPCLK# signal state machine 714 continues to assert the STPCLK# signal until low timer 713 signals the end of the first specified duration. When low timer 713 expires, STPCLK# signal state machine 714 resets high timer 715 and deasserts the STPCLK# signal until high timer 715 signals the end of the second specified duration. When high timer 715 expires, STPCLK# signal state machine 714 resets low timer 713 and asserts STPCLK# until low timer 713 expires. The cycle continues until switching device 612 asserts a SMI# signal to processor 103 causing processor 103 to run the SMM Handler code. In executing the instructions, processor 103 clears STPCLK# enable bit 753 which in turn causes the STPCLK# signal state machine 714 to deassert the STPCLK# signal. STPCLK# signal remains deasserted until a subsequent switch to the responsive low power mode. The clearing of STPCLK# enable bit 753 marks the beginning of the fully operational mode.

The cycle described above can also be interrupted by a break event. Clock controller 611 comprises of selection device 730 coupled to a plurality of break event lines. Selection device 730 in turn comprises of AND gate 731 and break event enable bits 732 coupled to processor 103. When a break event occurs, a break event signal is asserted on a break event line. Break events can include a network signal that the processor must service immediately or other operations which require immediate processor activity. When a break event signal is asserted, AND gate 731 generates a break signal if the associated enable bit 732 is set. Thus, processor 103 can select the break events that generate a break signal by selectively setting the associated enable bits 732. Processor 103 carries out the selection by utilizing the SMM Handler code which it runs prior to the assertion and deassertion of STPCLK# signal. When STPCLK# signal state machine 714 receives a break signal, it resets high timer 715 and deasserts STPCLK# signal for the second specified duration. It will be appreciated that a break event with the enable bit set causes STPCLK# signal state machine 714 to immediately deassert the STPCLK# signal for the second specified duration when clock controller 611 is in the responsive low power mode.

FIG. 6 is a state diagram illustrating the operation of STPCLK# signal state machine of FIG. 5. When the computer system powers up, STPCLK# signal state machine 714 transitions to the fully operational mode, state 760. In this state, STPCLK# is deasserted. When processor 103 receives an SMI# signal, it runs SMM Handler. In executing SMM Handler, processor 103 loads the low timer register with the first specified duration and loads high timer register with the second specified duration, sets the desired break event enable bits and sets the STPCLK# enable bit. State machine 714 then transitions to state 762 with low timer and high timer already reset. In state 762, state machine 714 asserts the STPCLK# signal. When state machine 714 receives a break signal or low timer 713 expires, state machine 714 transitions to state 763 where state machine 763 resets high timer 715. Then state machine 714 transitions to state 764 where it deasserts the STPCLK# signal. When state machine 714 receives a break signal, it transitions to state 763 and resets high timer 715. When high timer 715 expires, state machine 714 transitions to state 761 where it resets low timer 713 and transitions to state 762. When processor 103 deasserts STPCLK# enable bit 753, state machine 714 transitions back to state 760.

Figure 7A:
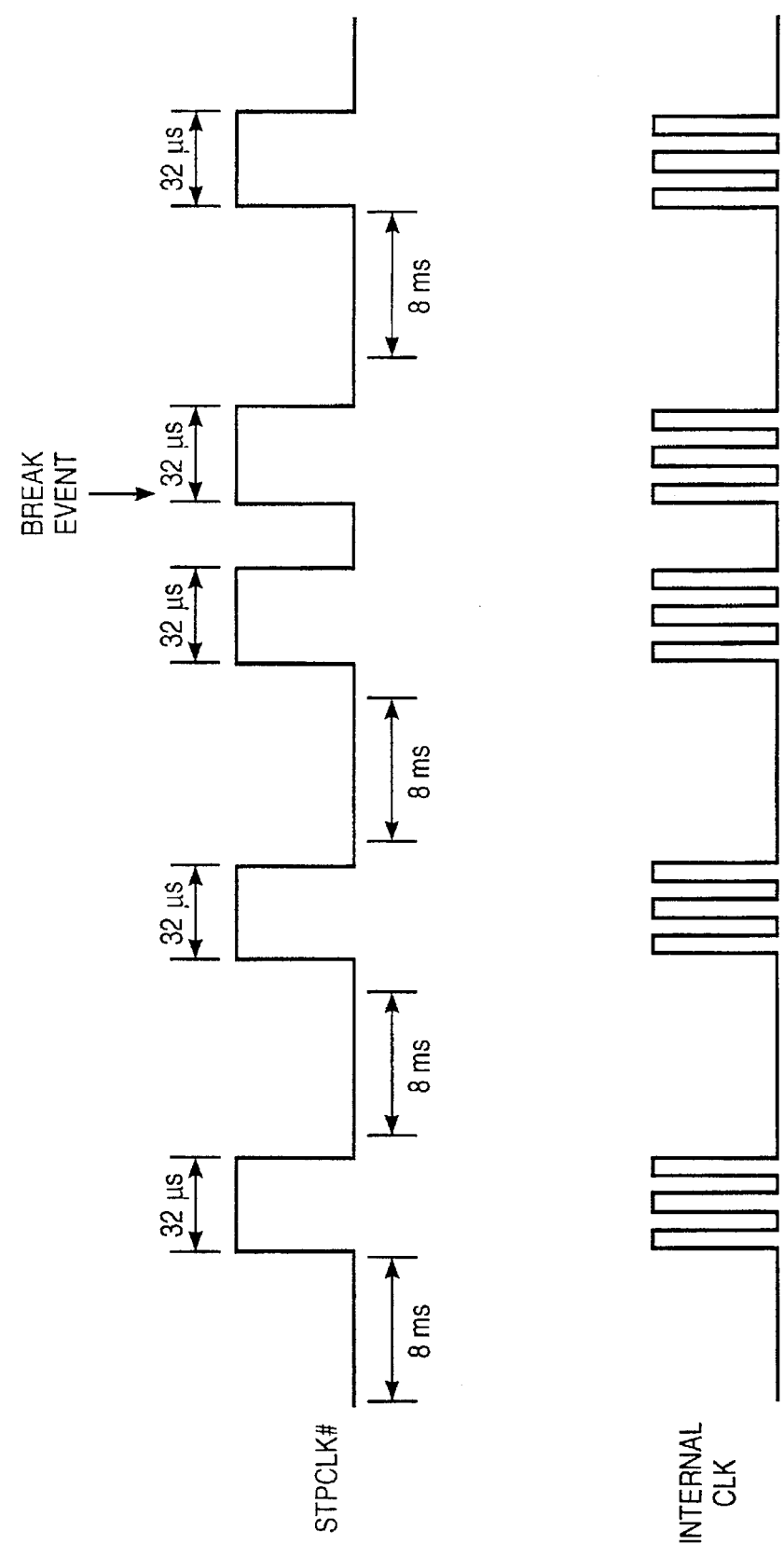
FIG. 7a is a timing diagram illustrating the operation of a clock controller of FIG. 5.

FIG. 7a is a timing diagram illustrating the operation of the clock controller of FIG. 5. In the responsive low power mode as described above, clock controller 611 asserts active low STPCLK# signal for a first specified duration and deasserts STPCLK# signal for a second specified duration. In this example, the first specified duration is eight milliseconds and the second specified duration is 32 microseconds. When STPCLK# is asserted, internal processor CLK is suppressed and when STPCLK# is deasserted, internal processor CLK is transmitted. Clock controller 611 also has circuitry allowing it to respond to break events. When a break event occurs as shown in FIG. 8, STPCLK# signal is deasserted for the second specified duration of 32 microseconds. Afterwards, STPCLK# signal is asserted for the first specified duration of eight milliseconds. It will be appreciated that the break event only affects the first specified duration of one cycle. Subsequent cycles continue unaffected by the break event.

FIG. 7b is a timing diagram illustrating communication signals being transmitted from a communication device. According to FIG. 7b, the interval between two consecutive communication signals has a duration greater than the sum of the first time duration and the second time duration of the STPCLK#. This ensures that one of the communication signals will be received while the STPCLK# is deasserted.

The assertion of a STPCLK# signal as described above suppresses the internal clock to portions of processor 103 because processor 103 has circuitry which enables the suppression. In one embodiment, processor 103 includes a plurality of functional blocks each performing a specified function in processor 103. Each functional block has a clock input coupled to an AND gate with two inputs to the gate. One input is coupled to the internal clock signal and the second input is coupled to the output of a NAND gate. Each NAND gate also has two inputs. One coupled to an inverted STPCLK# input line and the second coupled to a line connected to either a high or low voltage potential. The line is connected during the manufacture of processor 103 and determines whether clock suppression is enabled for that functional block. It will be appreciated that when the line is connected to a high voltage potential, clock suppression will never occur in that particular functional block. On the other hand, when the line is connected to a low voltage potential, clock suppression will occur when STPCLK# signal is asserted. In this manner, portions of processor 103 can be selected at manufacture for clock suppression. Under yet another embodiment, the second input of each NAND gate can be coupled to an enable bit. The enable bits act as a selection mechanism allowing processor 103 or other device to select and modify the particular functional block for clock suppression.

FIG. 8 is a block diagram illustrating a switching device of a seventh embodiment of the present invention. Switching device 612 includes counter 924 and selection device 916. Counter device 924 is activated when the computer system is powered up and begins counting elapsed time. Because the computer system powers up in the fully operational mode, the elapsed time maintained by counter device 924 is the elapsed time since the start of the fully operational mode. Counter device 924 includes a register for storing a preassigned value representing a specified elapsed time. Counter device 924 also includes a comparator for comparing the preassigned value to the elapsed time. When the elapsed time equals the preassigned value, an active low signal is generated which becomes the SMI# signal. Counter device 924 has a reload input coupled to the mouse device, and keyboard. When a signal is transmitted from either of the mouse device or keyboard, the counter is reset and starts counting the elapsed time from initial value. The counter is also reset to initial value when processor 103 loads the register with the preassigned value prior to the beginning of the fully operational mode. Thus, at the initiation of the fully operational mode, counter 924 is reset. Counter 924 is also reset when an input to the keyboard is made or when mouse movement is detected. In this manner, counter 924 measures the elapsed time between the last mode switch or keyboard input or mouse movement and asserts a SMI# signal when the elapsed time equals a preassigned value. In this manner, human interface through a keyboard or mouse reloads the counter which ensures that processor 103 is fully active and operative during such use.

Under other embodiments, switching device 612 also includes a real time clock device. The real time clock device has a register for storing a preassigned value representing a specified real time. In addition, the real time clock device has a comparator for comparing the preassigned value to the input provided by the real time clock. When the real time as indicated by the real time clock equals the preassigned value, an active low SMI# signal is asserted. In this manner, the real time clock device asserts a SMI# signal to switch modes when real time has reached a preassigned value. Under this embodiment though, the real time clock device is external to switching device 612 and transmits the active SMI# signal as an input to switching device 612.

Finally, switching device 612 includes selection device 916. Selection device 916 includes a plurality of enable bits. The enable bits allows the functional parameters of the power consumption controller to be selected and modified. Selection device 916 is coupled to an input line from which the enable bits can be set or cleared by processor 103 or other devices. Each of the enable bits is coupled to an AND gate 922 located between the associated device (i.e., mouse, keyboard, real time clock device, EXTSMI#) and the SMI# signal output. Thus, when a particular enable bit is set, SMI# signals generated by the associated device is transmitted to processor 103. On the other hand, when a particular enable bit is cleared, SMI# signals generated by the associated device is suppressed. In this example, selection device 916 includes counter enable bit 917, mouse counter reset enable bit 918, keyboard counter reset enable bit 919, real time clock enable bit 920, button enable bit 921, mouse power on enable bit 927 and keyboard power on enable bit 926. Other enable bits representing other events can also be included.

When the computer system powers up, it transitions to the fully operational mode. In the fully operational mode, processor 103 or another device can set counter enable bit 917, mouse counter reset enable bit 918, keyboard counter reset enable bit 919, real time clock enable bit 920, and button enable bit 921. Processor 103 or the other device can clear mouse power on enable bit 927 and keyboard power on enable bit 926. With this set of functional parameters, counter 924 is activated and the SMI# signal when generated is transmitted to processor 103. In addition, mouse movement and keyboard input while the system is in the fully operational mode will reset counter 924 because bits 918 and 919 are set. Moreover, the real time clock device can generate a SMI# signal that is transmitted to processor 103. Furthermore, the computer system can include an external button which when pressed generates an active low EXTSMI# signal. When the EXTSMI# signal is asserted, an SMI# signal is also asserted because bit 921 is set. It is to be appreciated that the assertion of a SMI# signal causes the computer system to transition to the responsive low power mode. Mouse movement and keyboard input do not generate a SMI# signal because bits 927 and 926 are cleared.

Before the system transitions to the responsive low power mode, processor 103 or another device can clear counter enable bit 917, mouse counter reset enable bit 918, and keyboard counter reset enable bit 919. Processor 103 or the other device can set mouse power on enable bit 927, keyboard power on enable bit 926, real time clock enable bit 920, and button enable bit 921. With this set of functional parameters, counter 924 is deactivated. Mouse movement, keyboard input and the pressing of the EXTSMI# button will generate a SMI# signal. The real time clock device can also generate a SMI# signal that will be transmitted to processor 103. The SMI# signal causes the computer system to transition back to the fully operational mode as described above. The specified real time can be changed in the responsive low power mode and in the fully operational mode. The real time clock device can include an input coupled to processor 103 or other device which allow them to change the preassigned value representing the specified real time in the real time clock device. Thus, a first real time can be assigned in the fully operational mode to transition the system to the responsive low power mode at the first real time and a second real time can be assigned in the responsive low power mode to transition the system to the fully operational mode at the second real time.

FIG. 9 is a flow chart illustrating the steps for controlling the power consumption of a processor. When the processor is first powered up, it transitions to the fully operational mode, block 939. Next, the processor selects the functional parameters which define events causing a switch to the responsive low power mode, block 940. The functional parameters are selected by setting and clearing the appropriate enable bits. The processor remains in the fully operational mode until a low power event occurs as shown by block 941. Low power events are defined by the functional parameters selected by the processor. Low power events can include a signal at a specified time to switch to a responsive low power mode, a signal from an external button device to switch to a responsive low power mode, and the expiration of a specified elapsed time as indicated by a counter. The counter can be reset upon an occurrence of a specified event, i.e., mouse movement or keyboard input. When a low power event occurs, the processor is switched to the responsive low power mode as shown in block 942. Functional parameters are modified in order to define events causing a switch to the fully operational mode. In addition, the first specified duration and the second specified duration is inputted and stored. The STPCLK# enable bit is also set marking the start of the responsive low power mode. As long as the first specified duration has not expired and no break event has occurred, the clock signal to the selected portions of the processor is suppressed, blocks 944 and 945. When the first specified duration has expired or a break event occurs, the clock signal to the selected portions of the processor is allowed as long as the second specified duration has not expired, blocks 946 and 947. When the clock signal is allowed to the select portions of the processor, the processor can respond to communications device signals, block 947. When the second specified duration has expired, the clock signal to the selected portions of the processor is suppressed until a break event occurs or the first specified duration has expired, blocks 944 and 945. In the above steps, after the clock signal has been suppressed or has been allowed a fully operational mode event will switch the processor to the fully operational mode, blocks 948, 949 and 950. On the other hand, when a fully operational mode event does not occur, the first specified duration or the second specified duration continues as applicable, blocks 948, 946, 949 and 944. Before the processor has been switched to the fully operational mode, the functional parameters which define events causing the switch to the responsive low power mode are modified. The processor returns to block 941 and continues in a loop until the processor is turned off.

In order to facilitate explanation of the embodiments of the present invention, the responsive low power mode has been described with clock suppression occurring first (STPCLK# asserted). However, under an alternative embodiment, clock allowance occurs first (STPCLK# deasserted) in the responsive low power mode. It will be appreciated that the alternative embodiment may be implemented merely by adjusting state machine 714 so that STPCLK# is deasserted first until the expiration of high timer 715 and then STPCLK# is asserted until the expiration of low timer 713.

Thus, a novel method and apparatus for controlling power consumption has been described.

What is claimed is:

1. A computer system having a full-power mode and a low-power mode of operation comprising:

a controller that generates an interrupt signal in response to a low power event or a fully operational event, the controller further generates a clock control signal, wherein the clock control signal is alternatively asserted for a first time duration and deasserted for a second time duration during the low-power mode of operation and the clock control signal is deasserted during the full-power mode of operation;

a processor coupled to the controller, wherein the processor suppresses an internal clock signal to at least one functional block within the processor in response to an asserted clock control signal and transmits the internal clock signal to the at least one functional block within the processor in response to a deasserted clock control signal; and a communication device coupled to the processor, wherein the communication device periodically provides communication signals to the processor, and wherein the processor is responsive to the communication device during the low-power mode of operation when the interval between two consecutive communication signals is greater than the sum of the first time duration and the second time duration.

2. The computer system of claim 1, wherein the controller includes a first register, a second register, and a state machine, further wherein the first register stores the first time duration and provides a first input signal to the state machine, the second register stores the second time duration and provides a second input signal to the state machine, the state machine receives an enable signal and alternatively generates an asserted clock control signal for the first time duration and a deasserted clock control signal for the second time duration in response to an asserted enable signal.

3. The computer system of claim 2, wherein the controller further includes a break event selection device coupled to the state machine, the break event selection device including at least one break event input that is capable of receiving the break event signal, when at least one of the break event inputs receive a break event signal that corresponds to a selected break event, the break event selection device provides a third input signal to the state machine, and the state machine causes the clock control signal to be immediately deasserted for at least the second time duration.

4. The computer system of claim 1, wherein the fully operational event includes a mouse movement, a keyboard entry, or a real-time clock signal.

5. The computer system of claim 1, wherein the low power event includes a count-down signal or a real-time clock signal.

6. The computer system of claim 1, wherein the controller further includes a low power/fully operational event selection device having at least one low power/fully operational event input that is capable of receiving a low power event signal or a fully operational event signal, when the low power/fully operational event selection device receives the low power event signal that corresponds to a selected low power event while in the full-power mode of operation, the switching device generates the interrupt signal to transition the computer system from the full-power mode to the low-power mode of operation, and when the low power event/fully operational event selection device receives the fully operational event signal that corresponds to a selected fully operational event while in the low-power mode of operation, the switching device generates the interrupt signal to transition the computer system from the low-power mode to the full-power mode of operation.

7. A method for controlling the power consumption of a computer system which includes a processor coupled to a communication device that periodically provides communication signals to the processor, the processor having a full-power mode and a low-power mode of operation, the method comprising the steps of:

(a) operating the processor in a full-power mode of operation;

(b) storing a set of functional parameters which specify a low power event and a fully operational event; and (c) switching the processor from the high-power mode of operation to the low-power mode of operation in response the low power event by alternatively asserting for a first time duration and deasserting for a second time duration a clock control signal, wherein a clock signal coupled to at least one functional block within the processor is suppressed in response to an asserted clock control signal and transmitted in response to a deasserted clock control signal, wherein the processor remains responsive to communication signals during the low-power mode of operation when the interval between two consecutive communication signals is greater than the sum of the first time duration and the second time duration.

8. The method of claim 7, further comprises the step of:

(d) switching the processor back to the full-power mode of operation in response to the fully operational event by deasserting the clock control signal, wherein the clock signal coupled to the at least one functional block within the processor is transmitted in response to the deasserted clock control signal.

9. The method of claim 8, wherein step (d) further comprises the step of modifying the functional parameters which define the low-power event.

10. The method of claim 8 wherein step (d) further comprises the step of clearing the enable bit.

11. The method of claim 7 wherein step (c) further comprises the steps of:

(i) storing the first time duration in a first register and storing the second time duration in a second register; and (ii) setting an enable bit that controls the assertion and deassertion of the clock control signal.

12. The method of claim 7 wherein step (c) further comprises the steps of modifying the functional parameters which define the high-power event.

13. A computer system having a full-power mode and a low-power mode of operation comprising:

a processor having a controller and at least one functional block, wherein the controller generates an interrupt signal in response to a low power event or a fully operational event, and further generates a clock control signal, wherein the clock control signal is alternatively asserted for a first time duration and deasserted for a second time duration during the low-power mode of operation and the clock control signal is deasserted during the full-power mode of operation, and further wherein at least one of the functional blocks receive an internal clock signal in response to a deasserted clock control signal; and a communication device coupled to the processor, wherein the communication device periodically provides communication signals to the processor, and the processor is responsive to the communication device during the low-power mode of operation when the interval between two consecutive communication signals is greater than the sum of the first time duration and the second time duration.

14. The computer system of claim 13, wherein the controller includes a first register, a second register, and a state machine, wherein the first register stores the first time duration and provides a first input signal to the state machine, the second register stores the second time duration and provides a second input signal to the state machine, and the state machine receives an enable signal and alternatively generates an asserted clock control signal for the first time duration and a deasserted clock control signal for the second time duration in response to an asserted enable signal.

15. The computer system of claim 14, wherein the clock controller further includes a break event selection device coupled to the state machine, wherein the break event selection device includes at least one break event input that is capable of receiving a break event signal, and when at least one of the break event inputs receive a break event signal that corresponds to a selected break event, the break event selection device provides a third input signal to the state machine, and wherein the state machine causes the clock control signal to be immediately deasserted for at least the second time duration.

16. The computer system of claim 13, wherein the switching device includes a low power/fully operational event selection device having at least one low power/fully operational event input that is capable of receiving a low power event signal or a fully operational event signal, when the low power/fully operational event selection device receives the low power event signal that corresponds to a selected low power event while in the full-power mode of operation, the switching device generates the interrupt signal to transition the computer system from the full-power mode to the low-power mode of operation, when the low power event/fully operational event selection device receives the fully operational event signal that corresponds to a selected fully operational event while in the low-power mode of operation, the switching device generates the interrupt signal to transition the computer system from the low-power mode to the full-power mode of operation.

17. The computer system of claim 13, wherein the fully operational event includes a mouse movement, a keyboard entry, or a real-time clock signal.

18. The computer system of claim 13, wherein the low power event includes a count-down signal or a real-time clock signal.

* * * * *